Figure 1:
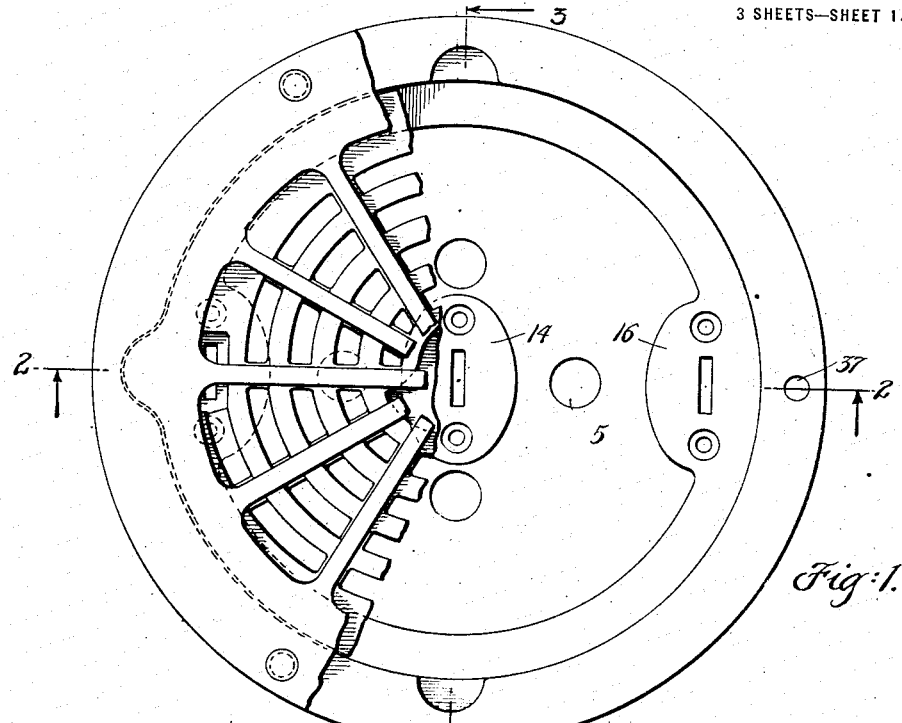

J. LAWRENCE.
ELECTRIC HEATER.
APPLICATION FILED MAY 29, 1916.

1,213,507.

Patented Jan. 23, 1917.
3 SHEETS—SHEET 1.

Inventor
James Lawrence
Attorneys
Kenyon & Kenyon

J. LAWRENCE.
ELECTRIC HEATER.
APPLICATION FILED MAY 29, 1916.

1,213,507.

Patented Jan. 23, 1917.
3 SHEETS—SHEET 2.

Inventor
James Lawrence
By his Attorneys
Kenyon & Kenyon

J. LAWRENCE.
ELECTRIC HEATER.
APPLICATION FILED MAY 29, 1916.
1,213,507.
Patented Jan. 23, 1917.
3 SHEETS—SHEET 3.
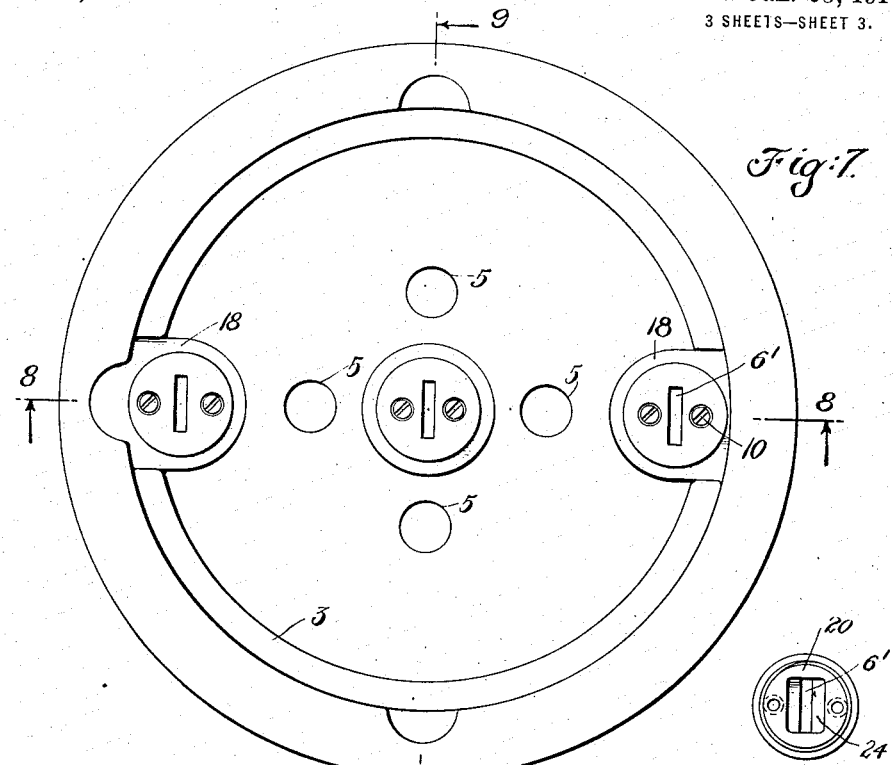
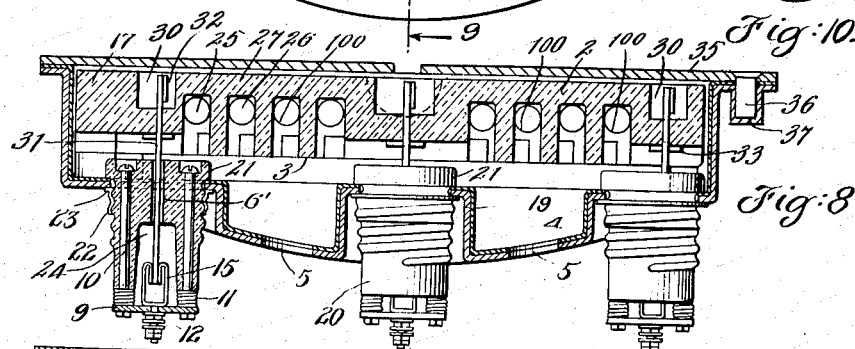
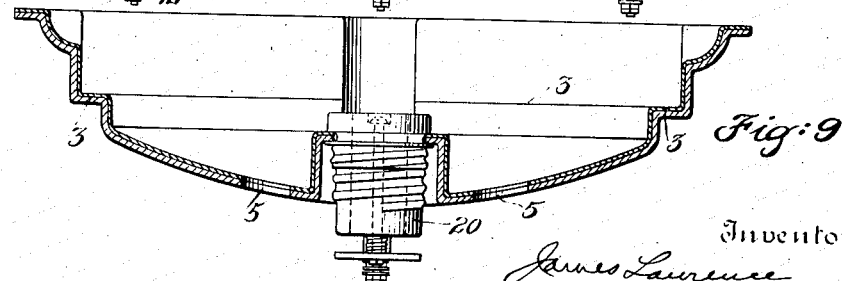

UNITED STATES PATENT OFFICE.

JAMES LAWRENCE, OF NEW YORK, N. Y., ASSIGNOR TO STANLEY G. RANGER, OF NEW YORK, N. Y.

ELECTRIC HEATER.

1,213,507.      Specification of Letters Patent.      Patented Jan. 23, 1917.

Application filed May 29, 1916. Serial No. 100,493.

*To all whom it may concern:*

Be it known that I, JAMES LAWRENCE, a subject of the King of Great Britain, and a resident of the borough of Manhattan, city, county, and State of New York, have invented certain new and useful Improvements in Electric Heaters, of which the following is a specification.

My invention relates to heaters, and particularly to that class of heaters wherein the heating element comprises an electric resistance member.

An object of my invention is to provide a heater comprising a heating unit and a receiving member therefor, arranged to insure that a maximum amount of the heat generated by the heating element of the unit will be rendered available for use.

Another object is to provide a heating unit comprising a heating element and a supporting plate therefor, said plate being formed to hold the heating element fixed in position and to permit of a proper circulation of air, and, at the same time, to permit the heating element to be readily placed in position on the plate.

In the attainment of this object, it is my further object to provide a heating unit comprising a plate of insulating material provided with a slot substantially uniform in width throughout its length and height for the accommodation of the heating element, means being provided for spacing and supporting the walls of the slot and retaining the element therein in position, the retaining means being so constituted that the least obstruction to the circulation of heat is presented, but the heating element may nevertheless be readily and firmly positioned.

Another object is to provide an electric heater having a receiving member which is formed to support a heating unit and coöperate therewith to secure the most efficient use of the heat generated thereby.

Another object is to provide an electric heater having a receiving member for supporting a heating unit, said receiving member being provided with electric supply contacts supported thereon and insulated therefrom, which are adapted to coöperate with electrodes on the heating unit.

Another object is to provide a heater having a receiving member which supports a heating unit and a protecting and supporting member.

Other and further objects and advantages, both as to operation and structure, will appear from the following description, taken in connection with the accompanying drawings forming part of this specification, and will be pointed out in the hereunto appended claims.

Figure 2:
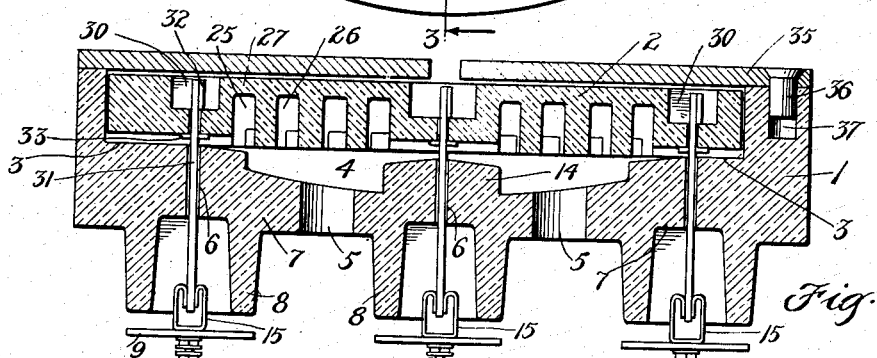
Figure 3:
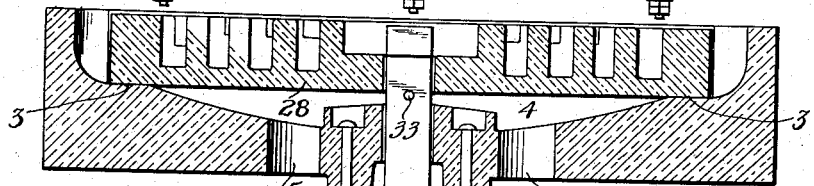
Figure 4:
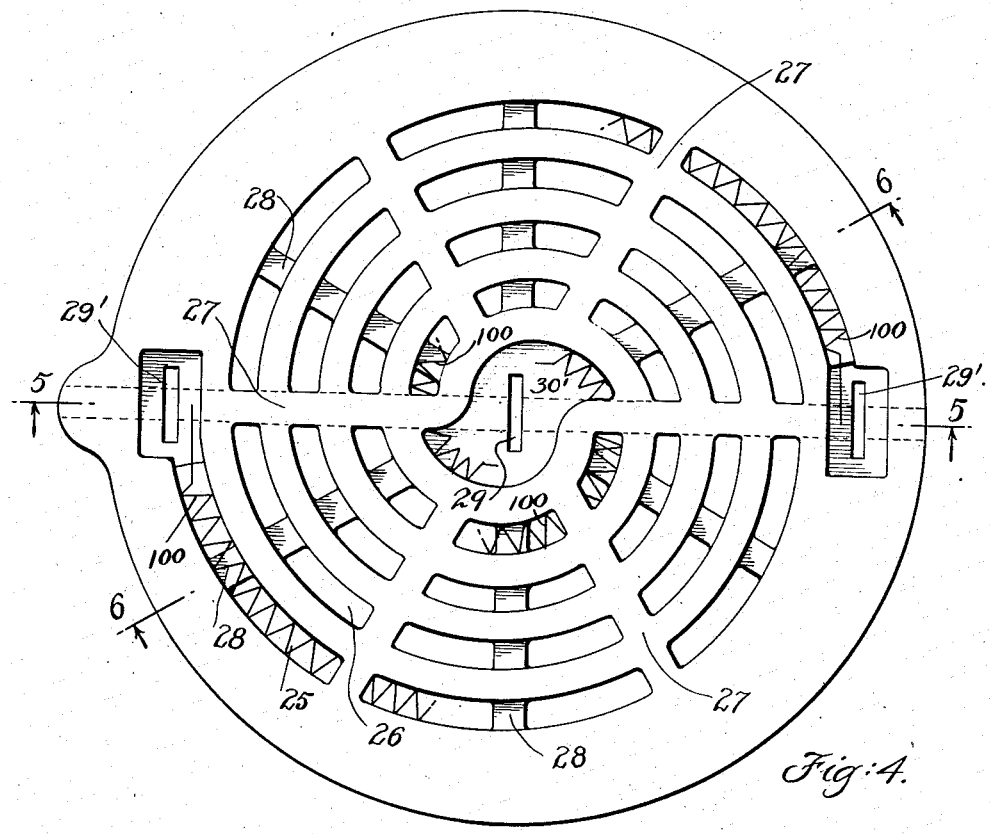
Figure 5:
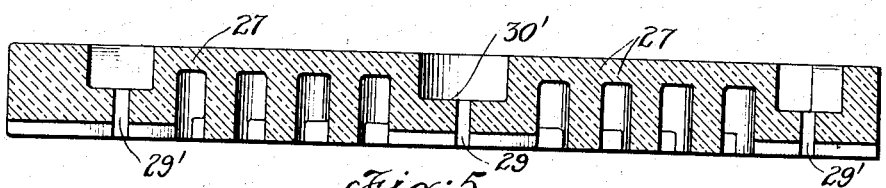
Figure 6:
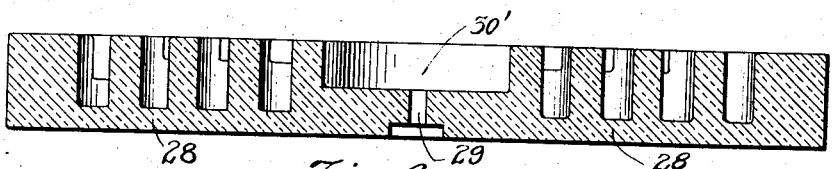

In the drawings, in which like reference characters indicate similar parts, Figure 1 is a top plan view of a heater embodying a preferred form of my invention, with parts broken away; Fig. 2 is a section on the line 2—2 of Fig. 1; Fig. 3 is a section on the line 3—3 of Fig. 1; Fig. 4 is a top plan view of a preferred form of an insulating plate of a heating unit embodying features of my invention; Fig. 5 is a sectional view on the line 5—5 of Fig. 4; Fig. 6 is a sectional view on the line 6—6 of Fig. 4; Fig. 7 is a top plan view of an alternative form of a receiving member of an electric heater embodying features of my invention; Fig. 8 is a sectional view on the line 8—8 of Fig. 7; Fig. 9 is a sectional view on the line 9—9 of Fig. 7; and Fig. 10 is a detailed view.

For the purpose of disclosing and interpreting my invention, an electric heater is described and illustrated which embodies a receiving member which is adapted to support a heating unit, and which carries electric supply contacts adapted to coöperate with electrodes carried by said heating unit, the said receiving member and heating unit being formed and adapted to coöperate with one another in such a way as to deliver, for any desired use, the heat generated by the heating elements of the unit, the whole device including a protecting element adapted to coöperate with the heating unit and receiving member to protect them against shocks and strains due to contact of articles desired to be heated.

While all of the elements and features referred to are disclosed in this specification, it is to be understood that my invention is not limited to the entire combination, but includes the sub-combinations and elements of the entire combination and any modifications, developments or adaptations of them or any of them which may occur or be apparent to those skilled in the art to which this invention appertains.

The electric heater described for the purpose of disclosing my invention comprises a receiving member 1 and a heating unit 2. The receiving member comprises a body member, which may be circular in form, as illustrated, the upper face of which is hollowed out, and a shoulder 3 is provided in said hollowed-out portion, which supports the heating unit 2. The hollowed-out portion extends below the shoulder 3, and forms the air-circulation chamber or space 4, into which air flows through the openings 5.

The form of receiving member shown in Figs. 1 to 3 is composed of a preferably solid block of insulating material, such as porcelain or the like, and openings 6 are formed therein, the function of which will hereinafter be more fully disclosed. The openings 6 extend through the receiving member into recesses 7 in the lower face of the receiving member, which are surrounded by the flanges 8. Supported below each recess 7 is a plate 9. This plate is attached to the receiving member by means of bolts 10, which extend through said member and said plates, the plates being spaced from the lower face of the member by means of washers or the like 11, and being secured to said bolts by means of nuts 12. Mounted upon the plates 9 are spring contact clips 15, the use of which will hereinafter be set forth, the clips being held on the plates 9 by means of bolts 12', which bolts connect the conductors 13 to said clips. It may be noted at this time that the flanges 8 protect the spring clips from the heat generated by the heating element. Surrounding the central opening 6, there is a wall 14, which acts to keep any material which may collect in the space 4 from falling through the said central opening 6 upon the spring contact clip 15 therebeneath. The openings 6 near the edge of the receiving member pass through an extended portion 16 of the shoulder 3 of the said receiving member, so that said openings are protected against material which might accumulate in the space 4. The receiving member, in addition to supporting the heating unit, acts to reflect and direct the heat generated by the unit to the article to be heated. The openings 5 therein also act as drain openings.

In the form of receiving member shown in Figs. 7 to 10, the body portion is made of a pressed or cast metallic plate, which may be provided with a lining of enamel, porcelain, or other insulating material 17. Portions 18 of the shoulder 3 are depressed below the level of the shoulder 3, and openings are formed therein. A portion of the material forming the center of the body member of the receiving member is pressed up at 19, and an opening is formed therein. Through the last-mentioned openings there extend supply-contact-supporting members 20, which, in the embodiment herein shown, are of insulating material. Shoulders 21, surrounding the upper ends of the contact-supporting members, hold said members from passing through said openings. In the embodiment herein shown, the outer surfaces of the contact-supporting members are formed with screw-threads, and collars 22 are screwed onto said members, and the flanges 23 on the upper ends of said collars contact with the edges of the last-mentioned openings, and the body member of the receiving member is gripped between said edges 23 and shoulders 21, and the contact-supporting member is firmly held in place. The means for supporting and securing the contact-supporting members in place, however, is capable of modification. The usual bolts 10 pass through the contact-supporting members and support the usual plates 9 therebeneath, the plates 9 being spaced from the members 20 by the usual washers 11. Secured to the plates 9 by the usual bolts 12 are the usual clips 15, the clips being positioned within recesses 24 formed within the lower ends of the contact-supporting members. The contact-supporting members have openings 6' passing therethrough, which perform a function similar to the openings 6 hereinbefore referred to, and the function of which will hereinafter be set forth.

It will be seen that the formation of the shoulder 3 and of the upwardly projecting portion 19 protects the openings 6' against any material that may collect in the usual air space 4.

The heating unit used in connection with the receiving member herein described, and supported on or contained therein, comprises a heating element 100 carried by a plate of insulating material, which has slots 25 and 26 formed therein, preferably in the shape of concentric spirals. These slots are preferably of uniform width from top to bottom and from beginning to end, and are wide enough to permit all material falling onto said unit to fall into the receiving member, from which it may be removed if it does not pass through openings 5 therein. Extending between the walls of these slots are two sets of wall-spacing and heating-element-positioning lugs or bridge pieces. The lugs 27 of one of these sets extend between the walls of the slots adjacent the upper surface of the heating unit plate, and the lugs 28 of the other set extend between the walls of said slots adjacent the lower surface of the plate. The plate forms a cage for the heating element of minimum cubical content. In the center of the plate there is a depression 30, within which an opening 29 extends through the plate, and near the edge of the plate there are depressions 30', within which openings 29' extend through the plate.

The heating element comprises a strip of material, which may be a resistance alloy of any well-known type, and which may be straight, or fluted, or coiled, or of any well known type. The heating element 100 extends from the recesses 30 around through the slots 25 and 26 and ends in the recesses 30' which surround the openings 29. As the heating element extends along through the slot, it passes below the lugs 27 and above the lugs 28, so that it is firmly held in position by the action of the walls of the slots on its sides and by the action of the lugs 27 on its top and the lugs 28 on its bottom.

It will be noted that the lugs 27 are not positioned directly above the lugs 28, but that several sets of lugs 28 are positioned on radii which are respectively positioned between the radii upon which the sets of lugs 27 are positioned. This permits the heating elements to be very easily positioned within the slots, although the heating elements are firmly held therein after they are positioned, for in positioning the elements they are threaded up and down through the slot, first over the top of one of the lugs 28, and then underneath one of the lugs 27, and, since the slots extend all the way through the plate, positioning the elements is simply a matter of threading them back and forth through the successive parts of the slot set off from one another by the lugs.

The ends of the heating elements 100 are attached to electrodes 31, which pass through the openings 29 and 29' and then through the openings 6 or 6' to coöperate with the supply contacts 15. The electrodes are secured in the openings 29 and 30 by means of lugs 32 secured thereto and coöperating with the bottom of the depressions 30 and 30' and pins 33 passing therethrough and coöperating with the lower surface of the plate holding the lugs 32 in contact with the bottoms of the depressions 30 and 30'.

From the structure described, it is apparent that air may pass through the lower wall of the receiving member into a chamber formed therein, wherein it is heated, after which it passes through the heating element, taking up more heat, and eventually it circulates around any article which is placed upon the heater. On the other hand, any material falling upon the heating element may pass freely therethrough and be collected in the chamber 4, and either drained thereoutof through the openings 5, or the heating unit may be lifted out of the receiver and any material which has collected therein may be freely cleaned out, for the inner surface of the receiver is preferably glazed to facilitate cleaning. The glazing obviously augments the reflecting action of the receiver.

The lower face of the heating unit plate is provided with grooves 34, to accommodate the pins 33, which hold the electrodes thereon. The heating unit is made slightly smaller than the receiving member, and a space for the circulation of air between the heating unit and receiving member is thereby provided. The upper surface of the plate is positioned below the upper surface of the receiving member, and the weight of any article which it is desired to heat is borne by the protecting element 35, which is supported upon the upper surface of the receiving member. The protecting element 35 may have any desired or any well-known form, and it is held in position on the receiving member by means of lugs 36, which extend into openings 37 in the upper face of the receiving member.

While I have described a device embodying my invention with considerable detail, for the purpose of disclosing my invention, I do not intend that I shall be limited to the specific features set forth, but intend that all modifications, variations, developments and adaptations thereof shall be considered a part of my invention, which I intend shall be defined by the hereunto appended claims.

What I claim as new and desire to secure by Letters Patent of the United States is the following:—

1. In a device of the class described, a heating unit member comprising a plate of insulating material having air circulation openings therein and a heating element supported by said plate to heat air circulating through said openings, and a receiving member for supporting said unit and extending across said openings and directing and reflecting the heat generated by said element.

2. In a device of the class described, a heating unit member comprising a plate of insulating material having air circulation openings therein and a heating element supported by said plate to heat air circulating through said openings, and a receiving member for supporting said unit and extending across said openings and directing and reflecting the heat generated by said element, said receiving member having air circulation openings.

3. In a device of the class described, a heating unit member comprising a plate of insulating material having air circulation openings therein and a heating element supported by said plate to heat air circulating through said openings, and a receiving member for supporting said unit and extending across said openings and directing and reflecting the heat generated by said element, said receiving member having air circulation openings, one of said members being formed to provide an air chamber between said receiving member and said unit.

4. In a device of the class described, a heating unit member having an electrode thereon, a receiving member for supporting said unit and having a passage therein for said electrode, one of said members being formed to provide a chamber between said elements, and means protecting said passage from material accumulating in said chamber.

5. In a device of the class described, a receiving member of heat resisting material having a depression in its upper face a heating unit in said depression, and a supporting and protecting plate supported by said member and extending over and out of contact with said unit.

6. In a device of the class described, a receiving member having a depression in its upper face adapted to accommodate a heating unit, and a protecting plate supported by said member and extending over said depression, said member having cavities in its upper face and said plate having projections extending thereinto.

7. In a device of the class described, a heating unit comprising a plate of insulating material having a slot therein for the passage of material falling on the plate, and a heating element positioned substantially wholly within said slot, and a receiving member for supporting said unit, said member having a reflecting surface of heat-insulating material to reflect the heat generated by said unit to an article to be heated.

8. In a device of the class described, a receiving member for a heating unit comprising a body portion and a separate supply-contact supporting member of insulating material carried thereby.

9. In a device of the class described, a heating unit having an electrode mounted thereon, a receiving member for said unit comprising a body member, and a supply-contact supporting member carried by said body member, said supporting member having a supply contact thereon and also having an opening therethrough for said electrode.

10. In a device of the class described, a heating unit having an electrode mounted thereon, a receiving member for said unit comprising a body member, and a supply-contact supporting member carried by said body member, said supporting member having a chamber formed in its under face and a passage leading to said chamber for said electrode and a supply contact in said chamber.

11. In a device of the class described, a heating unit having an electrode mounted thereon, a receiving member for said unit comprising a body member, said body member having a passage therethrough, a contact-supporting member positioned in said passage and having a passage leading therethrough for said electrode, and a supply contact mounted on said supporting member.

12. In a device of the class described, a heating unit having an electrode mounted thereon, a receiving member for said unit comprising a body member comprising a plate having a depressed portion in its upper surface and a portion projecting above the level of said depressed portion and having an opening therethrough for said electrode and a supply contact below said plate and coöperating with said electrode, whereby material collecting in said depressed portion is restrained from passing into said opening.

13. In a device of the class described, a heating unit having an electrode mounted thereon, a receiving member for said unit and comprising a body portion having an opening therethrough, and a contact-supporting member positioned in said opening and having a projection thereon engaging one face of said body portion, and means secured thereto to hold said projection in engagement.

14. In a device of the class described, a heating unit comprising a plate having a slot therein and bridge pieces extending across said slot, and a heating element extending along said slot and above certain of said pieces and below others thereof.

15. In a device of the class described, a heating unit comprising a plate having a slot therein and bridge pieces extending thereacross at intervals, and a heating element extending along said slot and alternately above and below said pieces.

16. In a device of the class described, a heating unit comprising a plate having a substantially continuous slot therein, a heating element, and means whereby said element may be fixed within said slot by threading said element back and forth through said plate from one face to the other.

17. In a device of the class described, a heating unit comprising a plate having a slot therein and bridge pieces extending thereacross at intervals adjacent the upper and lower surfaces of the plate whereby a cage is formed, and a heating element in said cage.

18. In a device of the class described, a heating unit comprising a plate having an opening therein, a heating element thereon, and an electrode passing through said opening and connected to said heating element, said electrode having a portion thereof engaging one face of said plate, and means secured to said electrode and engaging said plate to hold said portion in engagement.

19. In a device of the class described, a heating unit comprising a heating element and a supporting plate therefor of insulating material provided with a substantially continuous slot having a width equal to that of said element from one face of said plate to the other, and means extending transversely of said slot for supporting said element within said slot, whereby said heating element is contained within said plate and the slots within which it is positioned are substantially wholly unobstructed.

20. In a device of the class described, a heating unit comprising a plate having a substantially continuous spiral slot, a heating element in said slot, and means holding the said element in said slot, and supporting the walls of the slot one from the other.

In testimony whereof, I have signed my name to this specification.

JAMES LAWRENCE.